United States Patent
Okubo et al.

(10) Patent No.: US 10,113,218 B2
(45) Date of Patent: Oct. 30, 2018

(54) CAST AL—SI—MG-BASED ALUMINUM ALLOY HAVING EXCELLENT SPECIFIC RIGIDITY, STRENGTH AND DUCTILITY, AND CAST MEMBER AND AUTOMOBILE ROAD WHEEL MADE THEREOF

(71) Applicant: HITACHI METALS, LTD., Tokyo (JP)

(72) Inventors: Yoshiyuki Okubo, Moka (JP); Masaru Yoshida, Moka (JP)

(73) Assignee: HITACHI METALS, LTD., Minato-ku, Tokyo (JP)

( * ) Notice: Subject to any disclaimer, the term of this patent is extended or adjusted under 35 U.S.C. 154(b) by 134 days.

(21) Appl. No.: 15/128,132

(22) PCT Filed: Mar. 30, 2015

(86) PCT No.: PCT/JP2015/059869
§ 371 (c)(1),
(2) Date: Sep. 22, 2016

(87) PCT Pub. No.: WO2015/152133
PCT Pub. Date: Oct. 8, 2015

(65) Prior Publication Data
US 2017/0096726 A1    Apr. 6, 2017

(30) Foreign Application Priority Data

Mar. 31, 2014 (JP) ................. 2014-072271

(51) Int. Cl.
*C22C 21/02* (2006.01)
*C22F 1/043* (2006.01)
*C22C 21/04* (2006.01)

(52) U.S. Cl.
CPC .............. *C22C 21/02* (2013.01); *C22C 21/04* (2013.01); *C22F 1/043* (2013.01); *B60B 2310/202* (2013.01); *B60B 2310/542* (2013.01); *B60B 2360/104* (2013.01)

(58) Field of Classification Search
CPC ... C22C 21/02; C22F 1/043; B60B 2310/202; B60B 2310/542; B60B 2360/104
USPC ................... 420/544, 546; 148/440
See application file for complete search history.

(56) References Cited

U.S. PATENT DOCUMENTS

| | | | | |
|---|---|---|---|---|
| 3,856,360 A * | 12/1974 | Lindberg | ............... | C22C 21/02 420/534 |
| 4,104,089 A * | 8/1978 | Miki | ............... | C22C 21/02 148/415 |
| 5,123,973 A * | 6/1992 | Scott | ............... | C22F 1/043 420/549 |
| 5,837,070 A * | 11/1998 | Sainfort | ............... | C22F 1/043 420/544 |
| 5,853,508 A * | 12/1998 | Tack | ............... | C22F 1/043 148/550 |
| 6,634,199 B2 | 10/2003 | Nomura et al. | | |
| 6,773,666 B2 * | 8/2004 | Lin | ............... | C22F 1/043 420/544 |
| 8,409,374 B2 | 4/2013 | Lumley et al. | | |
| 8,574,382 B2 | 11/2013 | Dragulin et al. | | |
| 2002/0026966 A1 | 3/2002 | Nomura et al. | | |
| 2005/0163647 A1* | 7/2005 | Donahue | ............... | C22C 21/02 420/537 |
| 2009/0038720 A1 | 2/2009 | Lumley et al. | | |
| 2010/0126639 A1 | 5/2010 | Zuo et al. | | |
| 2012/0164021 A1 | 6/2012 | Dragulin et al. | | |

FOREIGN PATENT DOCUMENTS

| | | |
|---|---|---|
| JP | 1-319646 A | 12/1989 |
| JP | 2-61025 A | 3/1990 |
| JP | 2-232331 A | 9/1990 |
| JP | 2001-181809 A | 7/2001 |
| JP | 2005-2412 A | 1/2005 |
| JP | 2008-525629 A | 7/2008 |
| JP | 2008-291364 A | 12/2008 |
| JP | 2010-531388 A | 9/2010 |
| JP | 2013-159834 A | 8/2013 |

OTHER PUBLICATIONS

English translation of JP 2013/159834, Aug. 2013; 25 pages.*
International Search Report for PCT/JP2015/059869 dated Jun. 16, 2015.

* cited by examiner

*Primary Examiner* — Helene Klemanski
(74) *Attorney, Agent, or Firm* — Sughrue Mion, PLLC (57) ABSTRACT

A casting Al—Si—Mg-based aluminum alloy comprising by mass 12.0-14.0% of Si, 1.5-4.0% of Mg, and 0.10% or less of Mn, the balance being Al and inevitable impurities, and having excellent specific rigidity, strength and ductility, and its cast member.

8 Claims, 3 Drawing Sheets

CAST AL—SI—MG-BASED ALUMINUM ALLOY HAVING EXCELLENT SPECIFIC RIGIDITY, STRENGTH AND DUCTILITY, AND CAST MEMBER AND AUTOMOBILE ROAD WHEEL MADE THEREOF

CROSS REFERENCE TO RELATED APPLICATIONS

This application is a National Stage of International Application No. PCT/JP2015/059869 filed Mar. 30, 2015 (claiming priority based on Japanese Patent Application No. 2014-072271 filed Mar. 31, 2014), the contents of which are incorporated herein by reference in their entirety.

FIELD OF THE INVENTION

The present invention relates to a casting Al—Si—Mg-based aluminum alloy having excellent specific rigidity, strength and ductility, and a cast member and an automobile road wheel made thereof.

BACKGROUND OF THE INVENTION

Cast aluminum alloy members advantageous in reduced weight, the easiness of forming complicated shapes, low production cost, etc. are widely used as various parts. Particularly in automobiles, etc., JIS AC4B, ADC12, etc. of Al—Si—Cu—Mg-based aluminum alloys are used for cases and covers, and JIS AC4CH, ADC3, etc. of Al—Si—Mg-based aluminum alloys are used as underbody parts and road wheels. With energy saving and improved fuel efficiency required, further weight reduction and quality improvement are desired in cast aluminum alloy members constituting these parts.

The reduction of weight and thickness while keeping necessary strength has recently been achieved by optimum heat treatment and structure analysis using CAE, thereby meeting the above requirement of weight reduction. However, because of the later-described properties of the materials, there remains only little room for further weight reduction.

Though the above Al—Si—Cu—Mg-based aluminum alloys widely used for cases and covers have sufficient strength, they likely suffer reduced gas tightness due to corrosion when made very thin, because they contain Cu, an element having a large atomic weight and hindering corrosion resistance. Also, because the above Al—Si—Cu—Mg-based aluminum alloys have low ductility (fracture elongation of 2.0% or less), they are not easily used for members needing deformability, resulting in limited applications.

Because of larger ductility than that of Al—Si—Cu—Mg-based aluminum alloys, the above Al—Si—Mg-based aluminum alloys used for underbody parts, road wheels, etc. have large deformability. They also have good corrosion resistance because of substantially no Cu contained. Their 0.2% yield strength (strength index) is 100 MPa or more, on a level usable for vehicles, etc., and can be increased by a heat treatment, enabling thin cast members with reduced weight. However, because of Young's modulus of about 76 GPa, they cannot keep rigidity necessary for cast members when made thin, though they can keep strength and ductility. It is thus difficult to provide thinner cast members with reduced weight.

Conventional casting Al—Si—Mg-based alloys have densities of about 2.7 g/cm$^3$, and specific rigidity (Young's modulus divided by density) of about 28 GPa/(g/cm$^3$). However, higher demand is mounting on casting Al—Si—Mg-based aluminum alloys having larger specific rigidity with excellent strength and ductility, to provide thinner cases and covers, and lower-weight underbody parts and road wheels.

As an Al—Si—Mg-based aluminum alloy, JP 2008-291364 A discloses an aluminum alloy comprising 11.0-12.0% by weight of silicon, 0.7-2.0% by weight of magnesium, 0.1-1% by weight of manganese, at maximum 1% by weight of iron, at maximum 2% by weight of copper, at maximum 2% by weight of nickel, at maximum 1% by weight of chromium, at maximum 1% by weight of cobalt, at maximum 2% by weight of zinc, at maximum 0.25% by weight of titanium, 40 ppm of boron, and if necessary 80-300 ppm of strontium, the balance being aluminum (further elements and impurities introduced by production processes: at maximum 0.05% by weight each, and at maximum 0.2% by weight in total).

However, because the amount of Si increasing Young's modulus with a lower density is as small as 11.0-12.0% by weight, the aluminum alloy has small specific rigidity. Also, the inclusion of larger amounts of alloy elements having larger atomic numbers than that of Al, such as Mn, Fe, Cu, Ni, Cr, Co, Zn, etc., increases the density of the aluminum alloy, resulting in lower specific rigidity, as well as poorer ductility and corrosion resistance.

JP 2010-531388 A discloses a structural material of a Mg-containing, high-Si Al alloy; an ingot of the Al alloy produced by a semi-continuous casting method being subjected to a primary heat treatment to diffuse eutectic Si particles, and then thermally forged and heat-treated to a final shape and microstructure; the Al alloy being strengthened by a finer Al matrix, Si particles, and precipitated secondary particles; the Al alloy containing 0.2-2.0% by weight of Mg and 8-18% by weight of Si, and having a uniformly divided microstructure; the Al matrix having a equiaxial crystal structure having an average diameter of less than 6 μm; and the diffusion-distributed Si particles and other secondary particles having average diameters of less than 5 μm.

However, because this structural material is obtained through complicated steps comprising semi-continuous casting to form an ingot, and thermal forging, it is not suitable for cast articles directly obtained in desired shapes from a metal melt.

JP 2013-159834 A discloses a method for producing a resin-bonding cast aluminum alloy member, which comprises producing a cast aluminum alloy substrate containing 0.9-18% by mass of Si and 1.0-10.0% by mass of Mg by die-casting; and then etching the cast aluminum alloy substrate with an acidic aqueous etching solution of sulfuric acid and/or nitric acid at 30-80° C. for 5-15 minutes to dissolve $Mg_2Si$ crystals on a surface of this cast aluminum alloy substrate, thereby imparting fine roughness for excellent resin bondability to the cast aluminum alloy substrate surface.

OBJECT OF THE INVENTION

Accordingly, an object of the present invention is to provide a casting Al—Si—Mg-based aluminum alloy having large specific rigidity (Young's modulus divided by density) and excellent strength and ductility without needing complicated casting steps, and a cast member and an automobile road wheel made thereof.

DISCLOSURE OF THE INVENTION

In view of the above object, the inventor has conducted intensive research on the influence of the amounts of Si and Mg, alloy elements improving Young's modulus while lowering density, on 0.2% yield strength, an index of strength, and fracture elongation, an index of ductility, in the casting Al—Si—Mg-based aluminum alloy, finding a composition range securing high strength and ductility. The present invention has been completed based on such finding.

Thus, the casting Al—Si—Mg-based aluminum alloy of the present invention having excellent specific rigidity, strength and ductility comprises by mass 12.0-14.0% of Si, 1.5-4.0% of Mg, and 0.10% or less of Mn, the balance being Al and inevitable impurities.

The casting Al—Si—Mg-based aluminum alloy of the present invention preferably further comprises 0.05-0.3% by mass of Ti.

The casting Al—Si—Mg-based aluminum alloy of the present invention preferably further comprises 0.015-0.03% by mass of Sr.

The cast member of the present invention is made of the above Al—Si—Mg-based aluminum alloy.

The cast member of the present invention is preferably subjected to a T6 heat treatment.

The cast member of the present invention preferably has specific rigidity (Young's modulus divided by density) of 30 GPa/(g/cm$^3$) or more, 0.2% yield strength of 180 MPa or more, and fracture elongation of 3% or more.

The cast member of the present invention preferably has a cross section having no linear $Mg_2Si$ longer than 100 μm in optical microscopic observation.

The automobile road wheel of the present invention is constituted by the cast member.

Effects of the Invention

The casting Al—Si—Mg-based aluminum alloy of the present invention can be produced by a usual casting method needing no special steps, with suppressed casting cost, and has higher corrosion resistance than those of Al—Si—Cu—Mg-based aluminum alloys. Because the casting Al—Si—Mg-based aluminum alloy of the present invention has excellent specific rigidity, strength and ductility, cast members made thereof have high rigidity and toughness even with small thickness, enabling further weight reduction particularly in cast members for automobiles.

DESCRIPTION OF THE PREFERRED EMBODIMENTS

[1] Casting Al—Si—Mg-Based Aluminum Alloy

The casting Al—Si—Mg-based aluminum alloy of the present invention will be explained below. The amount of each alloy element is expressed by "% by mass," unless otherwise mentioned.

(1) 12.0-14.0% of Si

Si is an element forming a eutectic phase with Al to improve fluidity, suitable for cast aluminum alloys. Because the crystallized Si per se has high Young's modulus, a cast aluminum alloy containing a large amount of eutectic Si can have high Young's modulus. In addition, a higher Si content provides the aluminum alloy with a lower density. Namely, a higher Si content can increase specific rigidity, which is Young's modulus divided by density. To obtain this effect largely, the Si content is preferably 12.0% or more. Together with a later-described Mg content of 1.5% or more, the specific rigidity becomes 30 GPa/(g/cm$^3$) or more, resulting in a higher degree of freedom in the design of thin, weight-reduced cast members. Incidentally, if a larger amount of Si were contained without Mg, coarse primary Si crystals would be formed, resulting in poor ductility. However, the formation of primary Si crystals can be suppressed by containing 1.5% or more of Mg, to avoid decrease in ductility. However, when more than 14.0% of Si is added, primary Si crystals are formed extremely, resulting in extreme decrease in ductility, and thus failing to secure fracture elongation of 2.0% or more. Thus, the Si content is 12.0-14.0%, preferably 12.0-13.5%, more preferably 12.1-13.5%, further preferably 12.5-13.5%.

(2) 1.5-4.0% of Mg

In the Al—Si—Mg-based aluminum alloy, Mg is combined with Si to form $Mg_2Si$, a strong electron compound. Particularly, in an Al—Si—Mg-based aluminum alloy containing more than 10% of Si, eutectic $Mg_2Si$ is formed by containing 1% or more of Mg. This eutectic $Mg_2Si$ per se has extremely large Young's modulus, contributing to improvement in the Young's modulus of the cast aluminum alloy. With 12.0% or more of Si as described above, and 1.5% or more of Mg contained, the formation of coarse primary Si crystals is suppressed, thereby avoiding decrease in ductility. Because Mg has a smaller atomic weight than that of Al, a larger Mg content can provide the aluminum alloy with a lower density. Namely, a larger Mg content can increase the specific rigidity. However, when the Mg content is less than 1.5%, the alloy undesirably has 0.2% yield strength of less than 100 MPa, failing to have enough strength required for cast members particularly for vehicles. When the Mg content exceeds 4.0%, eutectic $Mg_2Si$ is undesirably formed excessively, resulting in as low fracture elongation (an index of ductility) as less than 2.0%. Accordingly, the Mg content is 1.5-4.0%, preferably 1.5-2.5%, more preferably 1.6-2.5%, further preferably 1.6-2.4%.

(3) 0.10% or Less of Mn

Mn forms an Al—Fe—Mn—Si intermetallic compound with an Al—Mn—Si intermetallic compound or without Fe, resulting in low ductility. Accordingly, more than 0.10% of Mn is undesirable. Thus, the Mn content is 0.10% or less.

(4) 0.3% or Less of Ti

Ti has functions of not only making crystal grains finer to improve the strength and ductility of the aluminum alloy, but also preventing the cracking of castings against a stress generated by the solidification shrinkage of an alloy melt. Though not indispensable, 0.05% or more of Ti is preferably contained to exhibit these functions effectively. Because the amount of Ti contained in a high-purity Al ingot as an inevitable impurity is less than 0.05%, Ti should be added to obtain the above effect when the high-purity Al ingot is used. However, when Ti exceeds 0.3%, an Al—Ti intermetallic compound is crystallized, rather decreasing the ductility of the aluminum alloy. Accordingly, Ti is 0.05-0.3%, more preferably 0.1-0.3%, when added. For example, in the case of using scraps of ductile 6000-series aluminum alloys, AC4CH alloys, etc., low-purity Al ingots, etc., which usually contain 0.05% or more of Ti as an inevitable impurity, the amount of Ti added is preferably adjusted depending on the Ti content in the starting material.

(5) 0.03% or Less of Sr

Sr has a function of making eutectic Si finer, thereby improving the ductility of the Al—Si—Mg-based aluminum alloy. Though not indispensable, Sr is preferably 0.015% or more to exhibit this function effectively. Because less than 0.015% of Sr is contained as an inevitable impurity in Al ingots, aluminum alloy scraps of AC4CH alloys, etc., Sr should be added to obtain the above effect. However, the effect becomes low by adding more than 0.03% of Sr. Because Sr has an atomic weight of 87.6, extremely larger than 27.0 of Al, 28.1 of Si, 24.3 of Mg, and 47.9 of Ti, the addition of excessive Sr undesirably increases the density of the aluminum alloy. Accordingly, Sr is 0.015-0.03%, preferably 0.015-0.02%, when added.

(6) Inevitable Impurities

From the aspect of recycling, scraps of 6000-series alloys and other aluminum alloys, low-purity Al ingots, etc. may be used as materials to be melted in large amounts, so that the molten materials may be contaminated with other elements than Si and Mg as inevitable impurities. These impurity elements would be permitted within ranges not hindering the object of the present invention, because it would need a huge cost to reduce their amounts below the detection limits. The amount of each impurity basically need only be less than a permissible limit according to JIS, etc. Preferable in the present invention are 0.10% or less of Cu, 0.10% or less of Zn, 0.17% or less of Fe, 0.10% or less of Mn, 0.05% or less of Ni, 0.05% or less of Cr, 0.05% or less of Pb, and 0.05% or less of Sn. Particularly, because Cu deteriorates corrosion resistance, and because Fe forms an Al—Fe—Mn—Si intermetallic compound with an Al—Fe—Si intermetallic compound or Mn, resulting in low ductility, the addition of Cu and Fe in amounts exceeding the above limits is undesirable.

[2] Cast Member

The cast member of the present invention can be produced by casting using a die, such as gravity casting, low-pressure casting, high-pressure casting, die-casting, etc. Because a denser casting structure provides higher strength and ductility, faster solidification is preferable in casting. Usable to this end are, for example, a method of thinning castings, a method of cooling a die, a method of using a die in a close contact with a melt to accelerate heat dissipation to the die, etc.

The cast member made of the Al—Si—Mg-based aluminum alloy of the present invention has relatively high strength and ductility without a heat treatment after casting, and its specific rigidity is about 10% or more larger than that of a conventional cast Al—Si—Mg-based aluminum alloy such as AC4CH. Because it is superior to Al—Si—Cu—Mg-based aluminum alloys in corrosion resistance, it is suitably for cast members usually made of Al—Si—Cu—Mg-based aluminum alloys, particularly for cases and covers with reduced thickness and weight. For example, gravity-cast members of the Al—Si—Mg-based aluminum alloy of the present invention have, in an as-cast state without subjected to a heat treatment, specific rigidity of 30.0 GPa/(g/cm$^3$) or more, fracture elongation of 2.0% or more, and 0.2% yield strength of 100 MPa or more, which are sufficient for cast parts of vehicles, etc. When higher strength and ductility are required, a heat treatment such as a solution treatment, an aging treatment, etc. can be conducted after casting.

The cast members of the present invention having such excellent specific rigidity, strength and ductility are suitable as cast parts of vehicles, etc. needing further reduced thickness and weight; for example, road wheels, chassis members, and power train members (space frames, steering wheel shafts, sheet frames, suspension members, engine blocks, cylinder head covers, chain cases, transmission cases, oil pans, pulleys, shift levers, instrument panels, intake surge tanks, pedal brackets, etc.) of automobiles, motorcycles, etc.

The present invention will be explained in more detail by Examples and Tables below, without intention of restriction.

Cast Member A

The compositions (other elements than the alloy elements shown in Table 1 are substantially Al and inevitable impurities) of the aluminum alloys of Examples 1-40 and Comparative Examples 1-23, and the measured Young's modulus, density, specific rigidity (Young's modulus divided by density), 0.2% yield strength and fracture elongation of a gravity-cast member A made of each aluminum alloy are shown in Table 1. Comparative Examples 1-3 are known aluminum alloys (JIS AC4CH in Comparative Example 1, JIS ADC3 in Comparative Example 2, and JIS AC4B in Comparative Example 3). The amounts of alloy elements constituting each aluminum alloy are expressed by % by mass, unless otherwise mentioned.

The cast member A was formed by the aluminum alloy of each Example and Comparative Example having the composition shown in Table 1, by a method described below, using a test-piece-casting die (shown in FIG. 2 of JIS H5202).

Industrial pure Al, pure Si, pure Mg, and an Al mother alloy containing optional metal elements were charged as starting materials for each alloy into a graphite crucible, and melted at 730-780° C. in the air to prepare each melt having the composition shown in Table 1. The melt was degassed by bubbling with an argon gas to remove inclusions and hydrogen, and then gravity-cast at a die temperature of 90-110° C. and a pouring temperature of 690-710° C. Each of the resultant cast members A was cooled to room temperature in the air, and a test piece was taken from a predetermined portion of each cast member A to measure its properties.

A 14B test piece of JIS Z 2241 was taken from a bottom portion (shown in FIG. 2 of JIS H5202) of each cast member A, and a tensile test was conducted on each test piece at room temperature according to JIS Z 2241, to measure 0.2% yield strength (typical index of strength) and fracture elongation (typical index of ductility).

The Young's modulus was measured on a test piece of 10 mm×80 mm×4 mm taken from a bottom portion of the cast member A, by a resonance method using a free-resonance modulus meter (JE-RT3 available from Nihon Techno-Plus Corp.).

The density was measured on a test piece of 10 mm×80 mm×4 mm taken from a bottom portion of the cast member A by an Archimedean method.

Evaluation of Cast Member A

Referring to Table 1, the measured properties will be evaluated below relative to the Mg content on each Si content level.

(1) Examples 1-4 (Si Content: 12.0%)

The cast members A of Examples 1-4 were made of aluminum alloys containing 12.0% of Si, and 1.45%, 2.47%, 3.01%, and 4.02%, respectively, of Mg. Any of them had specific rigidity of 30.0 GPa/(g/cm$^3$) or more, 0.2% yield strength of 100 MPa or more, and fracture elongation of 2.0% or more.

(2) Examples 5-8 (Si Content: 12.5%)

The cast members A of Example 5-8 were made of aluminum alloys containing 12.5% of Si, and 1.54%, 2.05%, 2.46%, and 4.03%, respectively, of Mg. Any of them had specific rigidity of 30.0 GPa/(g/cm$^3$) or more, 0.2% yield strength of 100 MPa or more, and fracture elongation of 2.0% or more.

(3) Examples 31 and 9-12 (Si Content: 12.9-13.0%)

The cast member A of Example 31 was made of an aluminum alloy containing 12.9% of Si and 2.71% of Mg, and the cast members A of Examples 9-12 were made of aluminum alloys containing 13.0% of Si, and 1.46%, 1.57%, 2.54%, and 3.99%, respectively, of Mg. Any of them had specific rigidity of 30.0 GPa/(g/cm$^3$) or more, 0.2% yield strength of 100 MPa or more, and fracture elongation of 2.0% or more.

(4) Examples 13-17 (Si Content: 13.5%)

The cast members A of Examples 13-17 were made of aluminum alloys containing 13.5% of Si, and 1.47%, 1.60%, 2.45%, 2.97%, and 4.01%, respectively, of Mg. Any of them had specific rigidity of 30.0 GPa/(g/cm$^3$) or more, 0.2% yield strength of 100 MPa or more, and fracture elongation of 2.0% or more.

(5) Examples 18-21 (Si Content: 14.0%)

The cast members A of Examples 18-21 were made of aluminum alloys containing 14.0% of Si, and 1.51%, 1.99%, 2.48%, and 4.00%, respectively, of Mg. Any of them had specific rigidity of 30.0 GPa/(g/cm$^3$) or more, 0.2% yield strength of 100 MPa or more, and fracture elongation of 2.0% or more.

(6) Examples 32 and 22-25 (Containing Ti)

The cast members A of Examples 32 and 22-25 were made of aluminum alloys additionally containing Ti. The aluminum alloy of Example 32 contained 12.7% of Si, 2.57% of Mg, and 0.13% of Ti, and the cast members A of Examples 22-25 were made of aluminum alloys containing 13.0% of Si, 1.49%, 1.60%, 2.52%, and 4.04%, respectively, of Mg, and 0.34%, 0.17%, 0.13%, and 0.05%, respectively, of Ti. Any of them had specific rigidity of 30.0 GPa/(g/cm$^3$) or more, 0.2% yield strength of 100 MPa or more, and fracture elongation of 2.0% or more.

(7) Examples 33 and 26-29 (Containing Sr)

The cast members A of Examples 33 and 26-29 were made of aluminum alloys additionally containing Sr. The cast member A of Example 33 was made of an aluminum alloy containing 12.9% of Si, 2.69% of Mg and 0.0290% of Sr, and the cast members A of Example 26-29 were made of aluminum alloys containing 13.0% of Si, 1.46%, 1.61%, 2.53%, and 4.03%, respectively, of Mg, and 0.0242%, 0.0186%, 0.0296%, and 0.0154%, respectively, of Sr. Any of them had specific rigidity of 30.0 GPa/(g/cm$^3$) or more, 0.2% yield strength of 100 MPa or more, and fracture elongation of 2.0% or more.

(8) Examples 30 and 34-40 (Containing Ti and Sr)

The cast members A of Examples 30 and 34-40 were made of aluminum alloys additionally containing Ti and Sr. Any of them had specific rigidity of 30.0 GPa/(g/cm$^3$) or more, 0.2% yield strength of 100 MPa or more, and fracture elongation of 2.0% or more.

(9) Comparative Examples 1-3

The cast members A of Comparative Examples 1-3 were made of JIS alloys conventionally widely used for casting (AC4CH in Comparative Example 1, ADC3 in Comparative Example 2, and AC4B in Comparative Example 3). Any of the cast members A of Comparative Examples 1-3 had specific rigidity of about 27 GPa/(g/cm$^3$), 10% or more lower than those of Examples shown in Table 1.

(10) Comparative Examples 4-7

The cast members A of Comparative Examples 4-7 were made of aluminum alloys containing 11.0% of Si, and 0.35%, 2.03%, 4.03%, and 4.96%, respectively, of Mg. The specific rigidities of Comparative Examples 4-6 were 29.0, 29.4, and 29.9 GPa/(g/cm$^3$), respectively, less than 30.0 GPa/(g/cm$^3$), though larger than those of the known aluminum alloys of Comparative Examples 1-3. Comparative Example 7 containing 4.96% of Mg had specific rigidity of 30.7 GPa/(g/cm$^3$), though its fracture elongation was less than 2.0%.

(11) Comparative Examples 8 and 9

The cast members A of Comparative Examples 8 and 9 were made of aluminum alloys containing 12.0% of Si, equal to the Si content of Examples 1-4, and 0.25%, and 4.98%, respectively, of Mg. Comparative Example 8 had specific rigidity of less than 30.0 GPa/(g/cm$^3$), and 0.2% yield strength of less than 100 MPa. Comparative Example 9 had fracture elongation of less than 2.0%.

(12) Comparative Examples 10 and 11

The cast members A of Comparative Examples 10 and 11 were made of aluminum alloys containing 12.5% of Si, equal to those of Example 5-8, and 0.80%, and 4.99%, respectively, of Mg. Comparative Example 10 had specific rigidity of less than 30.0 GPa/(g/cm$^3$), and 0.2% yield strength of less than 100 MPa. Comparative Example 11 had fracture elongation of less than 2.0%.

(13) Comparative Examples 12-14

The cast members A of Comparative Examples 12-14 were made of aluminum alloys containing 13.0% of Si, equal to those of Examples 9-12, and 0.51%, 0.69%, and 4.96%, respectively, of Mg. Comparative Examples 12 and 13 had 0.2% yield strength of less than 100 MPa. Comparative Example 14 had fracture elongation of less than 2.0%.

(14) Comparative Examples 15-17

The cast members A of Comparative Examples 15-17 were made of aluminum alloys containing 13.5% of Si, equal to those of Examples 13-17, and 0.05%, 0.71%, and 4.98%, respectively, of Mg. Comparative Examples 15 and 16 had 0.2% yield strength of less than 100 MPa. Comparative Example 17 had fracture elongation of less than 2.0%.

(15) Comparative Examples 18 and 19

The cast members A of Comparative Examples 18 and 19 were made of aluminum alloys containing 14.0% of Si, equal to those of Examples 18-21, and 0.20%, and 4.95%, respectively, of Mg. Comparative Example 18 had 0.2% yield strength of less than 100 MPa. Comparative Example 19 had fracture elongation of less than 2.0%.

(16) Comparative Examples 20-22

The cast members A of Comparative Examples 20-22 were made of aluminum alloys containing 15.0% of Si, and 1.05%, 2.51%, and 4.02%, respectively, of Mg. Any of them had fracture elongation of less than 2.0%.

(17) Comparative Example 23

The cast member A of Comparative Example 23 was made of an aluminum alloy containing 12.2% of Si, 1.44% of Mg, and additionally 0.16% of Ti, and 0.0241% of Sr. It had specific rigidity of less than 30.0 GPa/(g/cm$^3$), and 0.2% yield strength of less than 100 MPa.

Cast Member B (T6 Heat-Treated)

The cast member B was subjected to a T6 heat treatment to increase strength (0.2% yield strength). The aluminum alloys of Examples 41-43 having the compositions shown in Table 2 were cast by the same method as for the cast member A, cooled to room temperature in the air, and then subjected to a T6 heat treatment, which comprised a solution treatment at 540° C. for 4 hours and then an aging treatment at 150° C. for 0.5 hours. The properties of each cast member were measured on a test piece taken from the same portion as in the cast member A, by the same tensile test method, Young's modulus-measuring method and density-measuring method as in the cast member A.

(18) Examples 41-43

The cast members B of Examples 41-43 shown in Table 2 were made of aluminum alloys additionally containing Ti and Sr, which were subjected to a T6 heat treatment. Any of them had specific rigidity of 30.0 GPa/(g/cm$^3$) or more, 0.2% yield strength of 180 MPa or more, and fracture elongation of 3% or more. With the T6 heat treatment, cast members having extremely higher 0.2% yield strengths than those of the cast members A of Examples 34-40 not subjected to the heat treatment were obtained.

(19) Comparative Example 24

The cast member B of Comparative Example 24 was made of an aluminum alloy containing 12.9% of Si, 4.50% of Mg, and additionally Ti and Sr as shown in Table 2, which was subjected to a T6 heat treatment. It had as small fracture elongation as 0.9%, much poorer in ductility than Examples 41-43.

(20) Length of Linear Mg$_2$Si

Figure 1A:
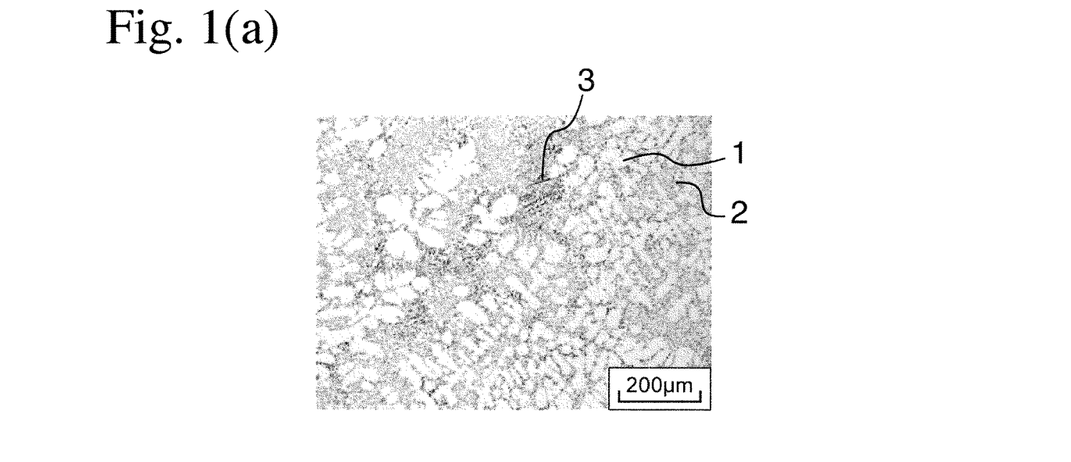
FIG. 1(a) is an optical photomicrograph showing the microstructure of the cast Al—Si—Mg-based aluminum alloy member of Example 41.
Figure 1B:
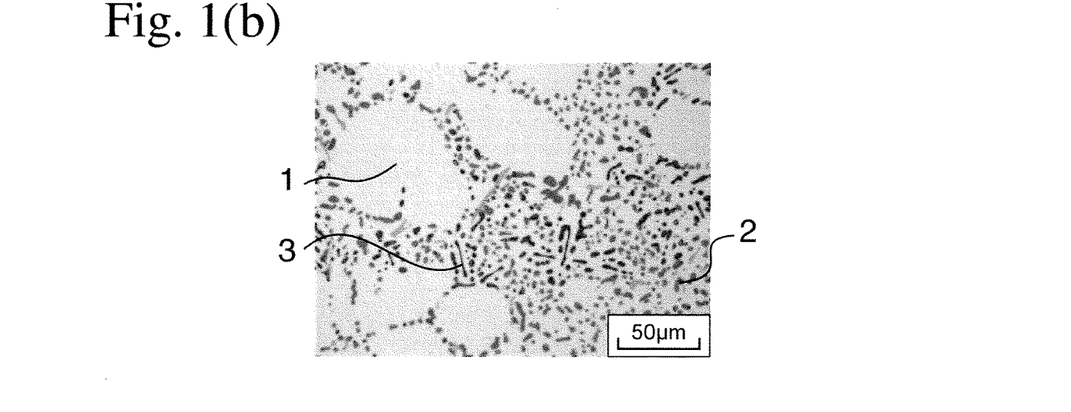
FIG. 1(b) is an optical photomicrograph enlargedly showing the microstructure of the cast Al—Si—Mg-based aluminum alloy member of Example 41.
Figure 2A:
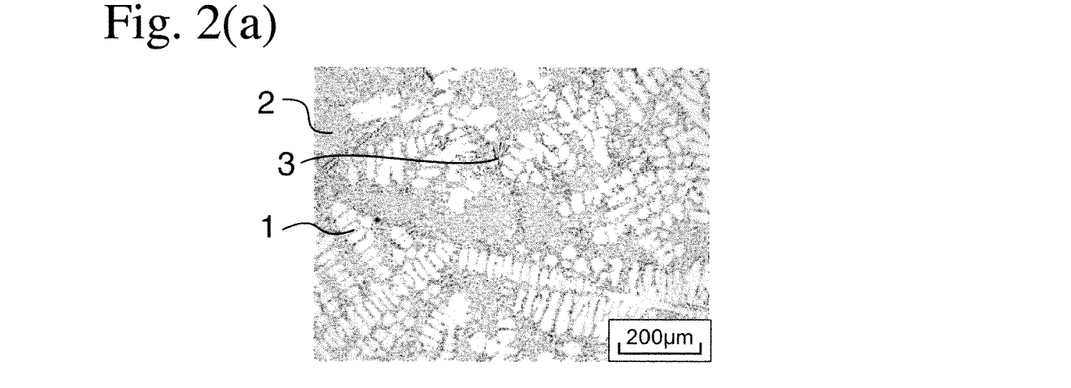
FIG. 2(a) is an optical photomicrograph showing the microstructure of the cast Al—Si—Mg-based aluminum alloy member of Example 42.
Figure 2B:
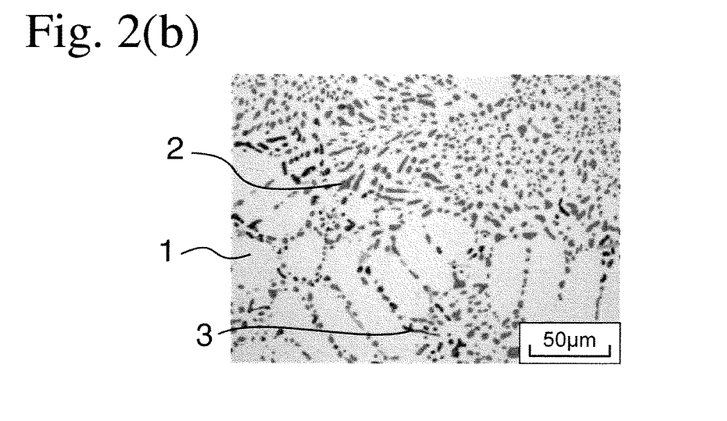
FIG. 2(b) is an optical photomicrograph enlargedly showing the microstructure of the cast Al—Si—Mg-based aluminum alloy member of Example 42.
Figure 3A:
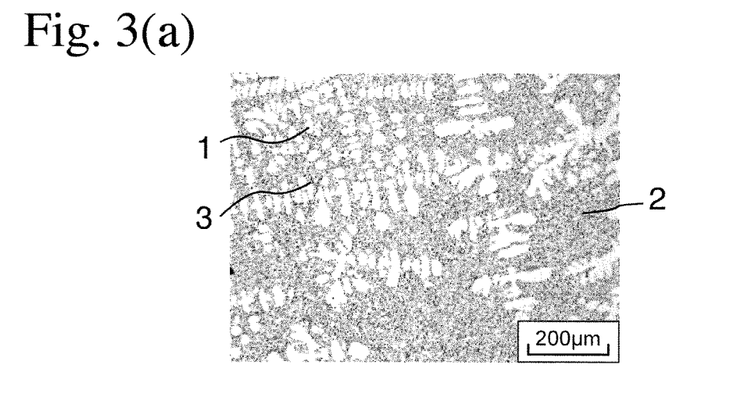
FIG. 3(a) is an optical photomicrograph showing the microstructure of the cast Al—Si—Mg-based aluminum alloy member of Example 43.
Figure 3B:
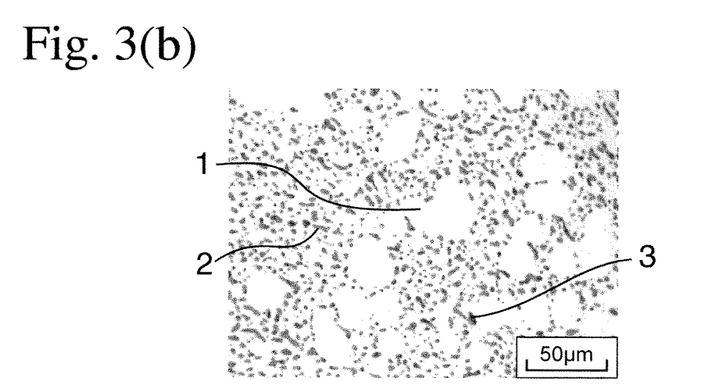
FIG. 3(b) is an optical photomicrograph enlargedly showing the microstructure of the cast Al—Si—Mg-based aluminum alloy member of Example 43.
Figure 4A:
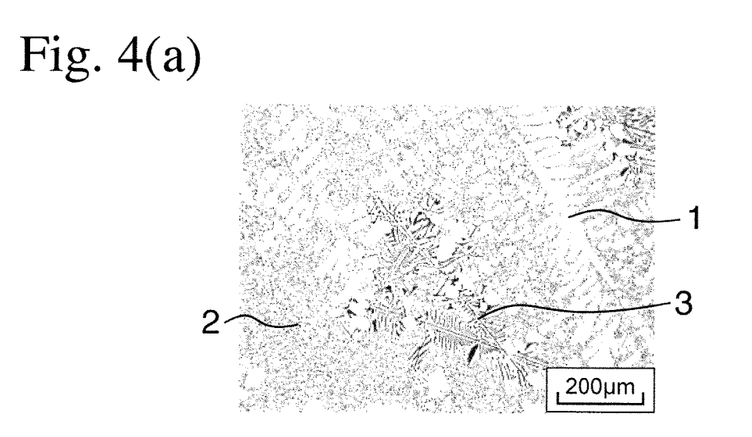
FIG. 4(a) is an optical photomicrograph showing the microstructure of the cast Al—Si—Mg-based aluminum alloy member of Comparative Example 24.
Figure 4B:
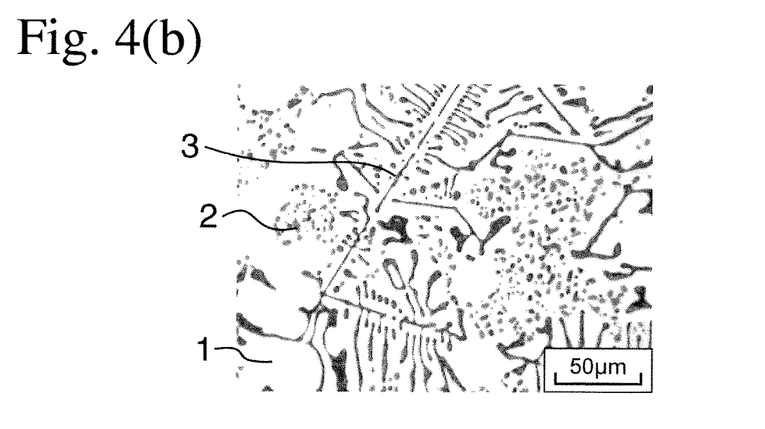
FIG. 4(b) is an optical photomicrograph enlargedly showing the microstructure of the cast Al—Si—Mg-based aluminum alloy member of Comparative Example 24.

FIG. 1(a) is an optical photomicrograph showing a cross section microstructure of the cast member B of Example 41, and FIG. 1(b) is an optical photomicrograph of higher magnification than FIG. 1(a). Likewise, FIGS. 2(a) and 2(b) are optical photomicrographs showing the microstructure of the cast member B of Example 42, FIGS. 3(a) and 3(b) are optical photomicrographs showing the microstructure of the cast member B of Example 43, and FIGS. 4(a) and 4(b) are optical photomicrographs showing the microstructure of the cast member B of Comparative Example 24. Observation revealed that any of them had an α phase (1), bright gray granular eutectic Si (2), and dark gray granular or linear Mg$_2$Si (3).

Particularly in the cast member B of Comparative Example 24 having fracture elongation of 0.9% [see FIGS. 4(a) and 4(b)], Mg$_2$Si (3) was aggregated in a dendritic shape, and crystallized in a so-called Chinese script shape. Mostly observed was linear Mg$_2$Si longer than 100 μm, despite the T6 heat treatment. It is considered that because coarse Chinese-script-shaped Mg$_2$Si was formed during casting in Comparative Example 24, linear Mg$_2$Si longer than 100 μm remained after the solution treatment, hindering ductility. On the other hand, in the cast members B of Examples 41-43 having fracture elongation of 3% or more, linear Mg$_2$Si longer than 100 μm was not observed. It is considered that relatively small Chinese-script-shaped Mg$_2$Si was formed during casting in Examples 41-43, and long Mg$_2$Si hindering ductility was finely divided by the solution treatment, so that the ductility was not hindered. Incidentally, the term "linear" used herein means a continuously connected straight or bent string-like shape.

Cast Member C (Automobile Road Wheel)

Table 3 shows an example of automobile road wheels as the cast member C. An aluminum alloy having the composition shown in Table 3 was cast into a road wheel by a low-pressure casting method, and subjected to a T6 heat treatment, which comprised a solution treatment at 540° C. for 4 hours and then an aging treatment at 150° C. for 0.5 hours. Properties were measured on a test piece taken from a spoke portion of the road wheel, by the same tensile test method, Young's modulus-measuring method and density-measuring method as in the cast member A.

(21) Example 44

The cast member C of Example 44 was an automobile road wheel obtained by casting an Al—Si—Mg-based aluminum alloy containing 13.0% of Si, 1.91% of Mg, 0.10% of Ti and 0.0191% of Sr as shown in Table 3 by a low-pressure casting method, and then subjecting the casting to a T6 heat treatment. It had specific rigidity of 30.2 GPa/(g/cm$^3$), 0.2% yield strength of 183 MPa, and fracture elongation of 9.7%. The 0.2% yield strength and the fracture elongation were sufficient for automobile road wheels, the specific rigidity being about 10% higher than that of conventional AC4CH-T6 of JIS. Thus, weight reduction of about 3% by mass was achieved, while keeping rigidity, strength and ductility on the same level as those of automobile road wheels made of the above conventional materials.

TABLE 1

| No. | Composition (% by mass)[1] | | | | | | |
|---|---|---|---|---|---|---|---|
|  | Si | Mg | Cu[2] | Fe[3] | Mn[4] | Ti[5] | Sr[6] |
| Example 1 | 12.0 | 1.45 | — | — | — | — | — |
| Example 2 | 12.0 | 2.47 | — | — | — | — | — |
| Example 3 | 12.0 | 3.01 | — | — | — | — | — |
| Example 4 | 12.0 | 4.02 | — | — | — | — | — |
| Example 5 | 12.5 | 1.54 | — | — | — | — | — |
| Example 6 | 12.5 | 2.05 | — | — | — | — | — |
| Example 7 | 12.5 | 2.46 | — | — | — | — | — |
| Example 8 | 12.5 | 4.03 | — | — | — | — | — |
| Example 9 | 13.0 | 1.46 | — | — | — | — | — |
| Example 10 | 13.0 | 1.57 | — | — | — | — | — |
| Example 11 | 13.0 | 2.54 | — | — | — | — | — |
| Example 12 | 13.0 | 3.99 | — | — | — | — | — |
| Example 13 | 13.5 | 1.47 | — | — | — | — | — |
| Example 14 | 13.5 | 1.60 | — | — | — | — | — |
| Example 15 | 13.5 | 2.45 | — | — | — | — | — |
| Example 16 | 13.5 | 2.97 | — | — | — | — | — |
| Example 17 | 13.5 | 4.01 | — | — | — | — | — |
| Example 18 | 14.0 | 1.51 | — | — | — | — | — |
| Example 19 | 14.0 | 1.99 | — | — | — | — | — |
| Example 20 | 14.0 | 2.48 | — | — | — | — | — |
| Example 21 | 14.0 | 4.00 | — | — | — | — | — |
| Example 22 | 13.0 | 1.49 | — | — | — | 0.34 | — |
| Example 23 | 13.0 | 1.60 | — | — | — | 0.17 | — |
| Example 24 | 13.0 | 2.52 | — | — | — | 0.13 | — |
| Example 25 | 13.0 | 4.04 | — | — | — | 0.05 | — |
| Example 26 | 13.0 | 1.46 | — | — | — | — | 0.0242 |
| Example 27 | 13.0 | 1.61 | — | — | — | — | 0.0186 |
| Example 28 | 13.0 | 2.53 | — | — | — | — | 0.0296 |
| Example 29 | 13.0 | 4.03 | — | — | — | — | 0.0154 |
| Example 30 | 13.0 | 2.54 | — | — | — | 0.14 | 0.0295 |
| Example 31 | 12.9 | 2.71 | — | — | — | — | — |
| Example 32 | 12.7 | 2.57 | — | — | — | 0.13 | — |
| Example 33 | 12.9 | 2.69 | — | — | — | — | 0.0290 |
| Example 34 | 12.1 | 2.08 | — | — | — | 0.13 | 0.0230 |
| Example 35 | 12.1 | 2.55 | — | — | — | 0.13 | 0.0275 |
| Example 36 | 12.9 | 3.74 | — | — | — | 0.13 | 0.0252 |
| Example 37 | 13.2 | 1.45 | — | — | — | 0.13 | 0.0249 |
| Example 38 | 13.3 | 2.09 | — | — | — | 0.13 | 0.0260 |
| Example 39 | 13.5 | 1.46 | — | — | — | 0.14 | 0.0247 |
| Example 40 | 13.8 | 2.02 | — | — | — | 0.13 | 0.0222 |
| Com. Ex. 1 | 7.0 | 0.35 | — | — | — | 0.10 | — |
| Com. Ex. 2 | 8.9 | 0.38 | — | 0.25 | 0.19 | — | — |
| Com. Ex. 3 | 8.5 | 0.40 | 3.0 | 0.31 | 0.18 | 0.15 | — |
| Com. Ex. 4 | 11.0 | 0.35 | — | — | — | — | — |
| Com. Ex. 5 | 11.0 | 2.03 | — | — | — | — | — |
| Com. Ex. 6 | 11.0 | 4.03 | — | — | — | — | — |
| Com. Ex. 7 | 11.0 | 4.96 | — | — | — | — | — |
| Com. Ex. 8 | 12.0 | 0.25 | — | — | — | — | — |
| Com. Ex. 9 | 12.0 | 4.98 | — | — | — | — | — |
| Com. Ex. 10 | 12.5 | 0.80 | — | — | — | — | — |
| Com. Ex. 11 | 12.5 | 4.99 | — | — | — | — | — |
| Com. Ex. 12 | 13.0 | 0.51 | — | — | — | — | — |
| Com. Ex. 13 | 13.0 | 0.69 | — | — | — | — | — |
| Com. Ex. 14 | 13.0 | 4.96 | — | — | — | — | — |
| Com. Ex. 15 | 13.5 | 0.05 | — | — | — | — | — |
| Com. Ex. 16 | 13.5 | 0.71 | — | — | — | — | — |
| Com. Ex. 17 | 13.5 | 4.98 | — | — | — | — | — |
| Com. Ex. 18 | 14.0 | 0.20 | — | — | — | — | — |
| Com. Ex. 19 | 14.0 | 4.95 | — | — | — | — | — |
| Com. Ex. 20 | 15.0 | 1.05 | — | — | — | — | — |
| Com. Ex. 21 | 15.0 | 2.51 | — | — | — | — | — |
| Com. Ex. 22 | 15.0 | 4.02 | — | — | — | — | — |
| Com. Ex. 23 | 12.2 | 1.44 | — | — | — | 0.16 | 0.0241 |

| No. | Young's Modulus (GPa) | Density (g/cm$^3$) | Specific Rigidity [GPa/(g/cm$^3$)] | 0.2% Yield Strength (MPa) | Fracture Elongation (%) |
|---|---|---|---|---|---|
| Example 1 | 78.7 | 2.622 | 30.0 | 100 | 7.0 |
| Example 2 | 79.0 | 2.623 | 30.1 | 108 | 5.9 |
| Example 3 | 79.2 | 2.618 | 30.3 | 110 | 5.3 |
| Example 4 | 79.8 | 2.602 | 30.7 | 111 | 3.1 |
| Example 5 | 78.9 | 2.625 | 30.1 | 103 | 4.5 |
| Example 6 | 79.0 | 2.622 | 30.1 | 105 | 5.1 |
| Example 7 | 79.4 | 2.618 | 30.3 | 108 | 4.5 |
| Example 8 | 80.3 | 2.586 | 31.1 | 116 | 3.1 |
| Example 9 | 79.3 | 2.618 | 30.3 | 106 | 3.4 |
| Example 10 | 79.4 | 2.616 | 30.4 | 108 | 3.9 |
| Example 11 | 79.9 | 2.610 | 30.6 | 110 | 5.3 |
| Example 12 | 80.5 | 2.581 | 31.2 | 121 | 3.1 |
| Example 13 | 79.6 | 2.617 | 30.4 | 112 | 3.7 |
| Example 14 | 79.7 | 2.614 | 30.5 | 114 | 4.0 |
| Example 15 | 80.1 | 2.609 | 30.7 | 118 | 4.5 |
| Example 16 | 80.3 | 2.598 | 30.9 | 125 | 4.2 |
| Example 17 | 80.9 | 2.576 | 31.4 | 135 | 3.0 |
| Example 18 | 80.2 | 2.610 | 30.7 | 111 | 2.3 |
| Example 19 | 80.3 | 2.605 | 30.8 | 116 | 2.3 |
| Example 20 | 80.5 | 2.603 | 30.9 | 121 | 2.1 |
| Example 21 | 81.3 | 2.572 | 31.6 | 140 | 2.0 |
| Example 22 | 79.3 | 2.619 | 30.3 | 107 | 3.6 |
| Example 23 | 79.5 | 2.621 | 30.3 | 108 | 4.3 |
| Example 24 | 79.9 | 2.608 | 30.6 | 112 | 5.4 |
| Example 25 | 80.4 | 2.580 | 31.2 | 122 | 3.2 |
| Example 26 | 79.4 | 2.619 | 30.3 | 106 | 3.9 |
| Example 27 | 79.4 | 2.621 | 30.3 | 109 | 4.4 |
| Example 28 | 79.9 | 2.610 | 30.6 | 112 | 5.9 |
| Example 29 | 80.5 | 2.580 | 31.2 | 125 | 3.4 |
| Example 30 | 79.8 | 2.608 | 30.6 | 110 | 6.0 |
| Example 31 | 80.0 | 2.608 | 30.7 | 111 | 5.7 |
| Example 32 | 79.5 | 2.618 | 30.4 | 108 | 5.6 |
| Example 33 | 80.0 | 2.608 | 30.7 | 115 | 5.4 |
| Example 34 | 78.8 | 2.624 | 30.0 | 109 | 5.9 |
| Example 35 | 79.0 | 2.622 | 30.1 | 117 | 6.2 |
| Example 36 | 80.8 | 2.589 | 31.2 | 111 | 5.1 |
| Example 37 | 79.3 | 2.619 | 30.3 | 107 | 3.6 |
| Example 38 | 79.7 | 2.614 | 30.5 | 111 | 4.1 |
| Example 39 | 79.5 | 2.619 | 30.4 | 106 | 3.4 |
| Example 40 | 80.4 | 2.605 | 30.9 | 110 | 3.3 |
| Com. Ex. 1 | 72.5 | 2.679 | 27.1 | 101 | 11 |
| Com. Ex. 2 | 71.1 | 2.661 | 26.7 | 105 | 8.7 |
| Com. Ex. 3 | 76.0 | 2.774 | 27.4 | 180 | 2.0 |
| Com. Ex. 4 | 76.8 | 2.644 | 29.0 | 84 | 8.5 |
| Com. Ex. 5 | 77.5 | 2.636 | 29.4 | 96 | 7.0 |
| Com. Ex. 6 | 78.1 | 2.615 | 29.9 | 105 | 3.9 |
| Com. Ex. 7 | 78.7 | 2.563 | 30.7 | 108 | 1.9 |
| Com. Ex. 8 | 77.8 | 2.634 | 29.5 | 92 | 8.0 |
| Com. Ex. 9 | 80.3 | 2.538 | 31.6 | 113 | 1.8 |
| Com. Ex. 10 | 78.5 | 2.629 | 29.9 | 97 | 5.4 |
| Com. Ex. 11 | 80.6 | 2.534 | 31.8 | 118 | 1.6 |
| Com. Ex. 12 | 78.9 | 2.624 | 30.1 | 98 | 5.4 |
| Com. Ex. 13 | 79.0 | 2.623 | 30.1 | 99 | 3.3 |
| Com. Ex. 14 | 80.8 | 2.522 | 32.0 | 126 | 1.0 |
| Com. Ex. 15 | 79.2 | 2.624 | 30.2 | 81 | 7.7 |
| Com. Ex. 16 | 79.4 | 2.622 | 30.3 | 98 | 3.1 |

TABLE 1-continued

| | | | | | |
|---|---|---|---|---|---|
| Com. Ex. 17 | 81.4 | 2.516 | 32.4 | 140 | 0.7 |
| Com. Ex. 18 | 79.7 | 2.630 | 30.3 | 99 | 2.6 |
| Com. Ex. 19 | 81.8 | 2.512 | 32.6 | 149 | 0.7 |
| Com. Ex. 20 | 80.5 | 2.613 | 30.8 | 118 | 1.5 |
| Com. Ex. 21 | 81.5 | 2.596 | 31.4 | 124 | 1.1 |
| Com. Ex. 22 | 82.2 | 2.567 | 32.0 | 143 | 0.7 |
| Com. Ex. 23 | 78.6 | 2.626 | 29.9 | 96 | 4.8 |

Note:
[1]The balance are Al and inevitable impurities.
[2]The term "—" in the column of Cu means containing 0.10% or less by mass of Cu as an inevitable impurity.
[3]The term "—" in the column of Fe means containing 0.17% or less by mass of Fe as an inevitable impurity.
[4]The term "—" in the column of Mn means containing 0.10% or less by mass of Mn as an inevitable impurity.
[5]The term "—" in the column of Ti means containing less than 0.05% by mass of Ti as an inevitable impurity.
[6]The term "—" in the column of Sr means containing less than 0.015% by mass of Sr as an inevitable impurity.

TABLE 2

| | Composition (% by mass)[1] | | | | | |
|---|---|---|---|---|---|---|
| No. | Si | Mg | Cu[2] | Fe[3] | Mn[4] | Ti | Sr |
| Example 41 | 12.8 | 1.57 | — | — | — | 0.14 | 0.0186 |
| Example 42 | 13.0 | 2.15 | — | — | — | 0.14 | 0.0239 |
| Example 43 | 12.9 | 3.96 | — | — | — | 0.13 | 0.0272 |
| Com. Ex. 24 | 12.9 | 4.50 | — | — | — | 0.14 | 0.0195 |

| No. | Young's Modulus (GPa) | Density (g/cm$^3$) | Specific Rigidity [GPa/(g/cm$^3$)] | 0.2% Yield Strength (MPa) | Fracture Elongation (%) |
|---|---|---|---|---|---|
| Example 41 | 79.0 | 2.621 | 30.1 | 191 | 4.8 |
| Example 42 | 79.6 | 2.612 | 30.5 | 180 | 8.5 |
| Example 43 | 80.4 | 2.583 | 31.1 | 204 | 3.4 |
| Com. Ex. 24 | 80.6 | 2.572 | 31.3 | 242 | 0.9 |

Note:
[1]The balance are Al and inevitable impurities.
[2]The term "—" in the column of Cu means containing 0.10% or less by mass of Cu as an inevitable impurity.
[3]The term "—" in the column of Fe means containing 0.17% or less by mass of Fe as an inevitable impurity.
[4]The term "—" in the column of Mn means containing 0.10% or less by mass of Mn as an inevitable impurity.

TABLE 3

| | Composition (% by mass)[1] | | | | | |
|---|---|---|---|---|---|---|
| No. | Si | Mg | Cu[2] | Fe[3] | Mn[4] | Ti | Sr |
| Example 44 | 13.0 | 1.91 | — | — | — | 0.10 | 0.0191 |

| No. | Young's Modulus (GPa) | Density (g/cm$^3$) | Specific Rigidity [GPa/(g/cm$^3$)] | 0.2% Yield Strength (MPa) | Fracture Elongation (%) |
|---|---|---|---|---|---|
| Example 44 | 78.5 | 2.597 | 30.2 | 183 | 9.7 |

Note:
[1]The balance are Al and inevitable impurities.
[2]The term "—" in the column of Cu means containing 0.10% or less by mass of Cu as an inevitable impurity.
[3]The term "—" in the column of Fe means containing 0.17% or less by mass of Fe as an inevitable impurity.
[4]The term "—" in the column of Mn means containing 0.10% or less by mass of Mn as an inevitable impurity.

What is claimed is:

1. A casting Al—Si—Mg-based aluminum alloy comprising by mass 12.0-14.0% of Si, 1.5-4.0% of Mg, 0.10% or less of Mn, and 0.10% or less of Cu, the balance being Al and inevitable impurities, and having excellent specific rigidity, strength and ductility.

2. The casting Al—Si—Mg-based aluminum alloy according to claim 1, which further comprises 0.05-0.3% by mass of Ti.

3. The casting Al—Si—Mg-based aluminum alloy according to claim 1, which further comprises 0.015-0.03% by mass of Sr.

4. A cast member made of the Al—Si—Mg-based aluminum alloy recited in claim 1.

5. The cast member according to claim 4, which is subjected to a T6 heat treatment.

6. The cast member according to claim 5, which has specific rigidity (Young's modulus divided by density) of 30 GPa/(g/cm$^3$) or more, 0.2% yield strength of 180 MPa or more, and fracture elongation of 3% or more.

7. The cast member according to claim 6, whose cross section has no linear Mg$_2$Si longer than 100 μm in optical microscopic observation.

8. An automobile road wheel, which is the cast member recited in claim 5.

* * * * *